United States Patent
Mayes

(10) Patent No.: US 7,236,934 B1
(45) Date of Patent: Jun. 26, 2007

(54) TAILORED METHOD AND SYSTEM FOR CUSTOM MANUFACTURED BOOKS

(75) Inventor: Robert C. Mayes, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1260 days.

(21) Appl. No.: 09/653,224

(22) Filed: Aug. 31, 2000

(51) Int. Cl.
*G06Q 99/00* (2006.01)
*B42B 13/00* (2006.01)
*B42C 13/00* (2006.01)

(52) U.S. Cl. .............. 705/1; 705/7; 705/8; 412/1; 412/14; 412/17

(58) Field of Classification Search .......... 705/1, 705/7, 8, 14, 26, 27; 412/19, 13, 8, 16, 32, 412/1, 14, 9, 17; 270/1.02, 1.03, 21.1, 54; 364/468, 401
See application file for complete search history.

(56) References Cited

U.S. PATENT DOCUMENTS

| | | | |
|---|---|---|---|
| 4,528,643 A | 7/1985 | Freeny, Jr. ............... 364/900 |
| 4,598,376 A * | 7/1986 | Burton et al. ............ 364/470 |
| 5,036,472 A | 7/1991 | Buckley et al. .......... 364/479 |
| 5,056,029 A | 10/1991 | Cannon .................... 364/468 |
| 5,213,461 A * | 5/1993 | Kalisher ................... 412/4 |
| 5,442,567 A | 8/1995 | Small ........................ 364/479 |
| 5,465,213 A * | 11/1995 | Ross ......................... 364/468 |
| 5,513,116 A | 4/1996 | Buckley et al. .......... 364/479 |
| 5,513,117 A | 4/1996 | Small ........................ 364/479 |
| 5,546,316 A | 8/1996 | Buckley et al. ......... 364/479.03 |
| 5,552,994 A | 9/1996 | Cannon et al. .......... 364/468.01 |
| 5,555,496 A | 9/1996 | Tackbary et al. ....... 364/401 R |
| 5,559,714 A | 9/1996 | Banks et al. ........... 364/479.03 |
| 5,600,563 A | 2/1997 | Cannon et al. ......... 364/468.24 |
| 5,615,123 A | 3/1997 | Davidson et al. ...... 364/479.03 |
| 5,748,484 A | 5/1998 | Cannon et al. ......... 364/479.03 |
| 6,011,758 A | 1/2000 | Dockes et al. .......... 369/30 |
| 6,012,890 A * | 1/2000 | Celorio Garrido ...... 412/19 |

FOREIGN PATENT DOCUMENTS

| EP | 1022541 | * | 7/2000 |
| WO | WO 99/17934 | * | 4/1999 |

OTHER PUBLICATIONS

"Technology: . . . Automation", Oct. 1983, Financial Times, p. 6.*

(Continued)

*Primary Examiner*—Dean Tan Nguyen
(74) *Attorney, Agent, or Firm*—Matthew L. Wade

(57) ABSTRACT

A book on demand system for manufacturing a set books. The system includes an order placement system and a book manufacturing system. The order placement system includes a computer and a database for storing books in an electronic form. A customer can operate the computer to access the database and to select a set of books to purchase. In addition, the customer can define the storage space will be used to store the set of books. The computer responds to this customer input by manufacturing the set of books so that the books can be placed physically within the storage space.

13 Claims, 8 Drawing Sheets

OTHER PUBLICATIONS

Eberhard, M. "E-Book Economics" Mar. 1999, Publishers Weekly, 246, 10, 22(1).*

Stevens, T. "Pedal Pushers.", Jul. 17, 2000, Industry Week, 249, 12, 46.*

Taylor, J. 1-2-3., PC magazine, v6, n18, p. 104, Oct. 27, 1987, Dialog file 275: 01213680.*

Hardyment, C., New Statesman (1996), v127, n4376, p. 50 (2), Mar. 13, 1998, Dialog file 148: 10114994.*

Pending U.S. Appl. No. 09/602,861; filed: Jun. 23, 2000; Titled: System And Method For Creating Customized Book-Displays; Inventor: Robert C. Mayes.

* cited by examiner

TAILORED METHOD AND SYSTEM FOR CUSTOM MANUFACTURED BOOKS

BACKGROUND OF THE INVENTION

A customer often wishes to purchase a set of books and store these books in a particular bookcase. Unfortunately, the books may not completely fit in the bookcase. This situation presents the customer with a problem. Prior solutions to this problem include the customer purchasing a new bookcase that is large enough to accommodate the set of books. This solution is obviously disadvantageous as it requires the customer to spend valuable time to find a book case that meets the customers needs and that is available to purchase. In addition, the new bookcase can be expensive.

Compounding this problem, is the fact that every customer will have a different set of preferences for the bookcase contents, requiring an individualized solution to that customers preferences, even if two or more customers have identical bookcases What is needed is a way for a customer to obtain a set of books will fit into his/her own book case.

SUMMARY OF THE INVENTION

The present invention may be implemented as a method for manufacturing a single set of books for a customer. The method preferably includes manufacturing the books in the set so that the books can be physically placed within a particular book storage space. At least one dimension of the book storage space being defined by the customer. The method may also include receiving input from the customer indicating the at least one dimension, receiving input from the customer identifying each book in the set of books and receiving payment information from the customer to purchase the set of books, prior to performing the manufacturing step.

The present invention may be implemented as a book on demand system that includes an order placement system capable of receiving input from a user identifying a set of books and at least one dimensions of a book storage space. In addition, the book on demand system includes apparatus for manufacturing the set of books so that the set of books can be placed physically within the book storage space. Preferably, the order placement system is further capable of receiving payment information from the user to purchase the set of books and the apparatus for manufacturing the set of books manufactures the set of books only when the payment information is received.

The present invention may also be implemented as a method for manufacturing books. The method includes receiving input from a customer identifying books the customer wishes to purchase, receiving input from the same customer defining at least one dimension of a book storage space and producing a single copy of each book identified by the customer in a manner so the books, as a set, can be stored within the book storage space. The method further may include receiving payment from the customer to purchase a single copy of each book identified by the customer prior to producing the single copy of each book.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
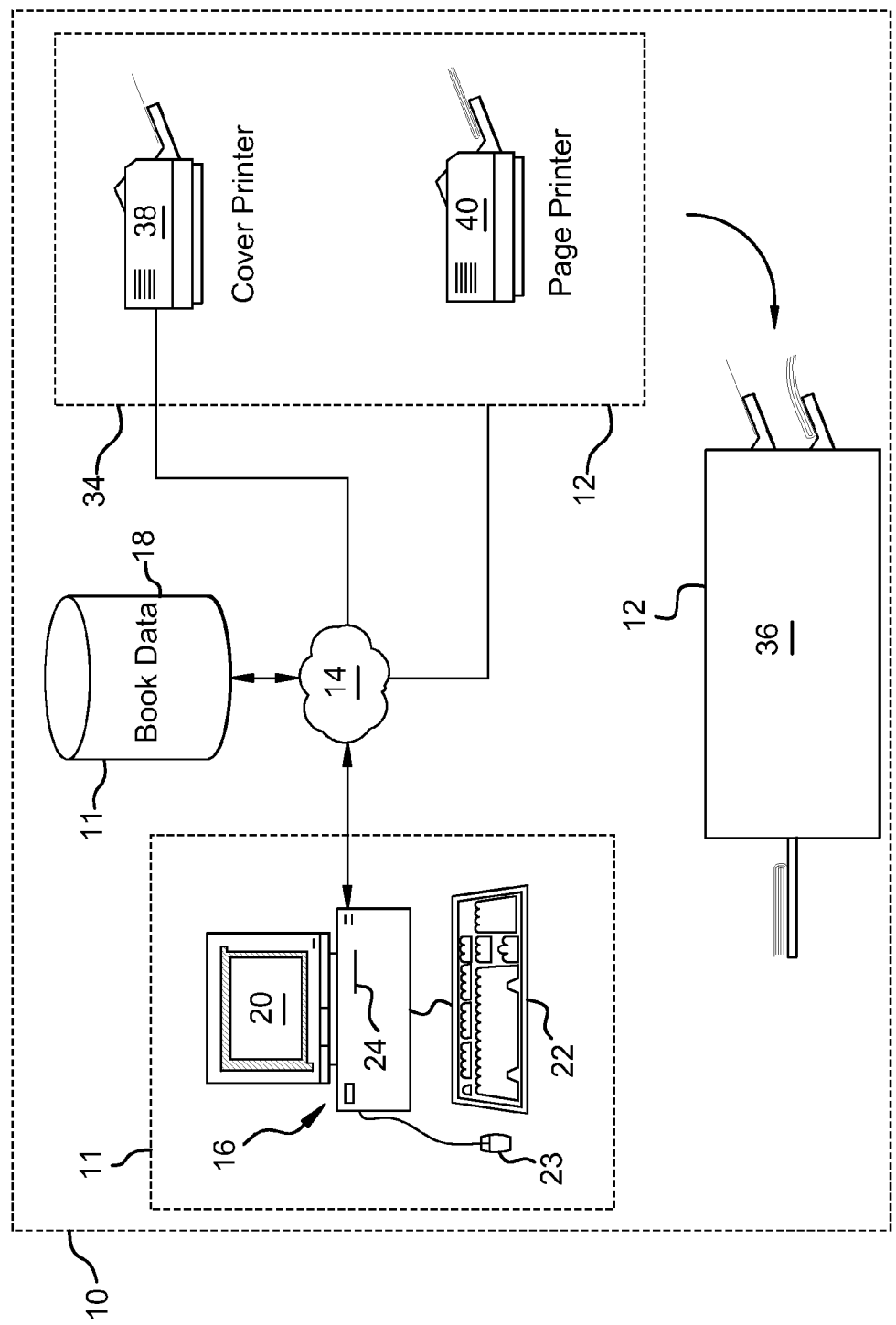
FIG. 1 is a system diagram of a book-on demand system embodying one implementation of the invention.

For purposes of this application, the phrase "set of books" and "book set" are used interchangeably.

As shown in the drawings for purposes of illustration, the invention is embodied in a novel book-on demand manufacturing system that allows a customer to purchase a set of books that is customized to fit into his/her existing book case, or some other pre-defined storage area such as a shelf, cabinet, locker, etc.

FIG. 1 is a system diagram of a book-on demand system 10 constructed in accordance with the invention. The system 10 includes an order placement system 11 and a book manufacturing system 12 electronically coupled together by a communication link 14. The communication link 14 may represent a local interface or a network such as an Intranet or the INTERNET.

As shown, the order placement system 11 includes a computer 16 and a database 18. The computer 16 provides a user interface that includes a display screen 20 and user input devices. In this example, the user input devices include a keyboard 22 and a mouse 23.

The book manufacturing system 12 includes a print module 34 and a book finishing module 36. In this embodiment, the print module 34 includes a cover printer 38 for printing book covers and a page printer 40 for printing book pages. Preferably, both of these two printers are high speed and high resolution color printers and are able to print onto media of various lengths, widths and thicknesses. It is noted, however, that a book on demand system incorporating the invention may alternatively include one or it may include more than two printers.

The finishing module 36 includes equipment (which may be standard) for trimming both the book pages and the book covers produced by the printer module 34. In addition, the finishing module 36 is used to bind the pages and covers together so as to produce a finished book.

Figure 2:
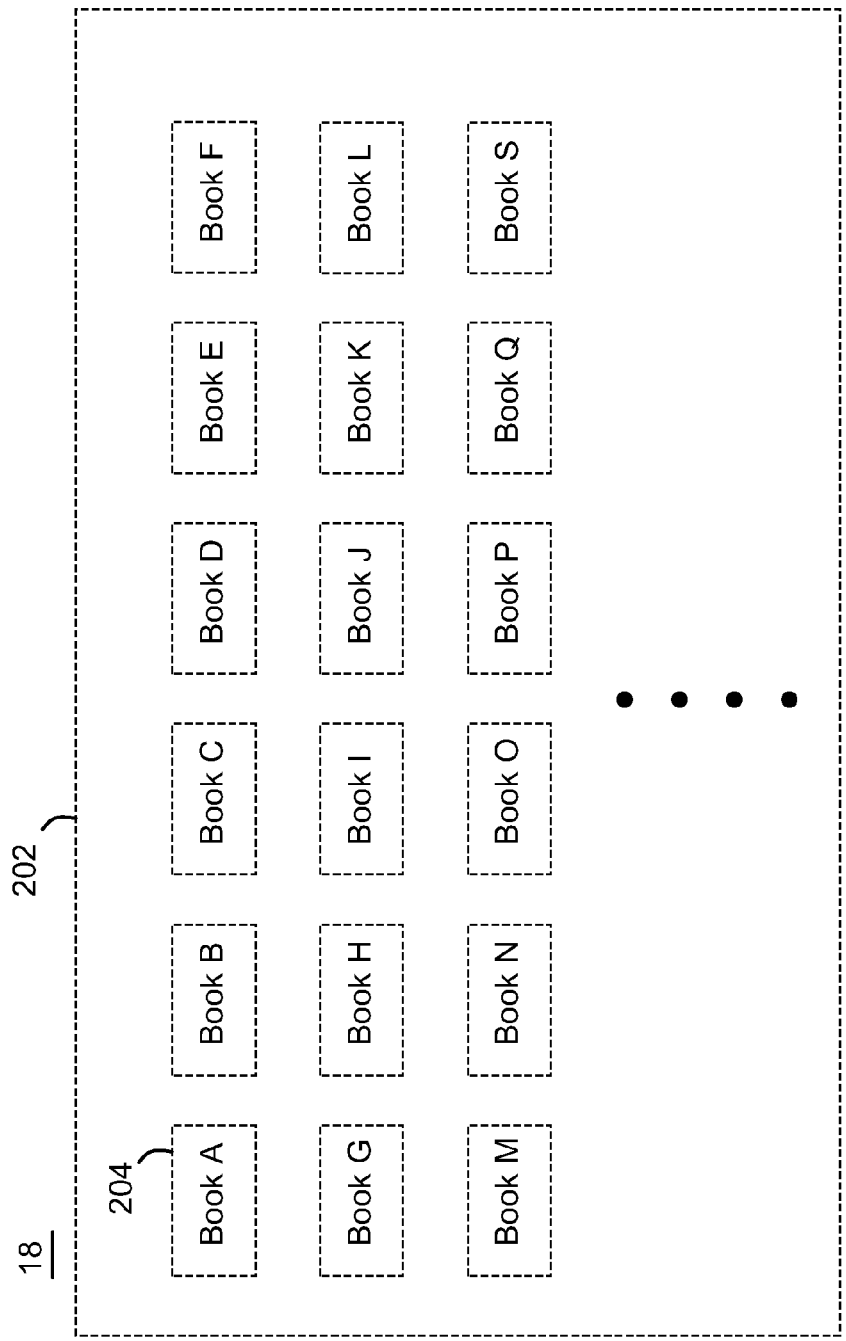
FIG. 2 illustrates the contents of a database that is part of the book-on demand system.

FIG. 2 is an abstract drawing illustrating the contents of the database 18. As shown, the database 18 is used to store a set of files 202. Each file from the set of files 202 is designated by a book title and describes the printed information in that book. For example, the set of files 202 includes a file 204 that is designated "book A". That file includes data that describes the information (which can be both graphical and textual information) that is to be printed on the cover and inner pages of book A.

Figure 3:
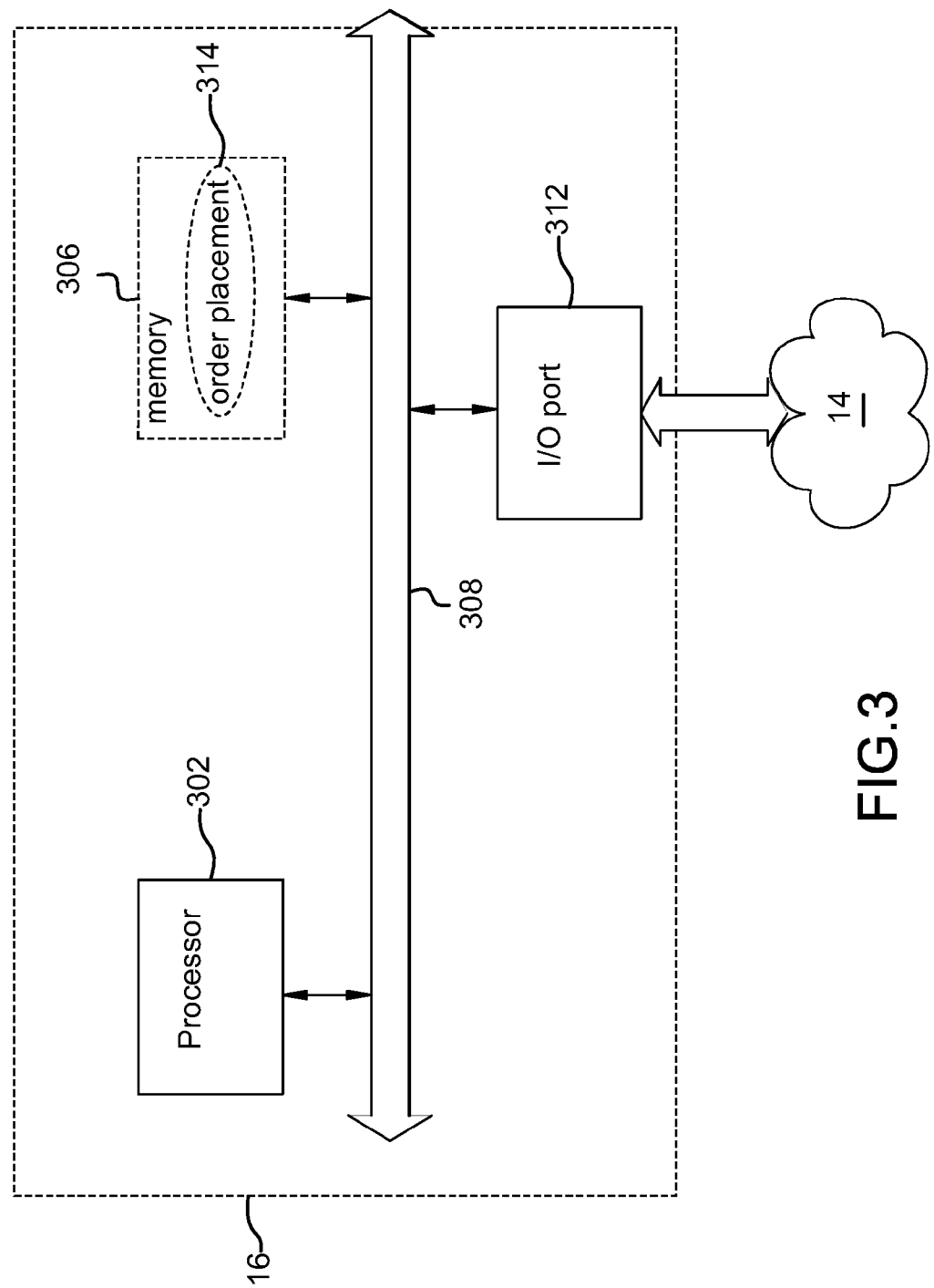
FIG. 3 shows a high level schematic diagram of a computer that is part of the book on demand system.

FIG. 3 shows a high level schematic diagram of the computer 16. As shown, the computer 16 includes a processor 302, a memory 306 and an I/O port 312 all connected to a bus 308. The I/O port 312 facilitates communications between the computer 16 and the communication link 14.

The processor 302 operates to execute various programs stored in the memory 306. One of these programs is an order placement program 314.

Figure 4A:
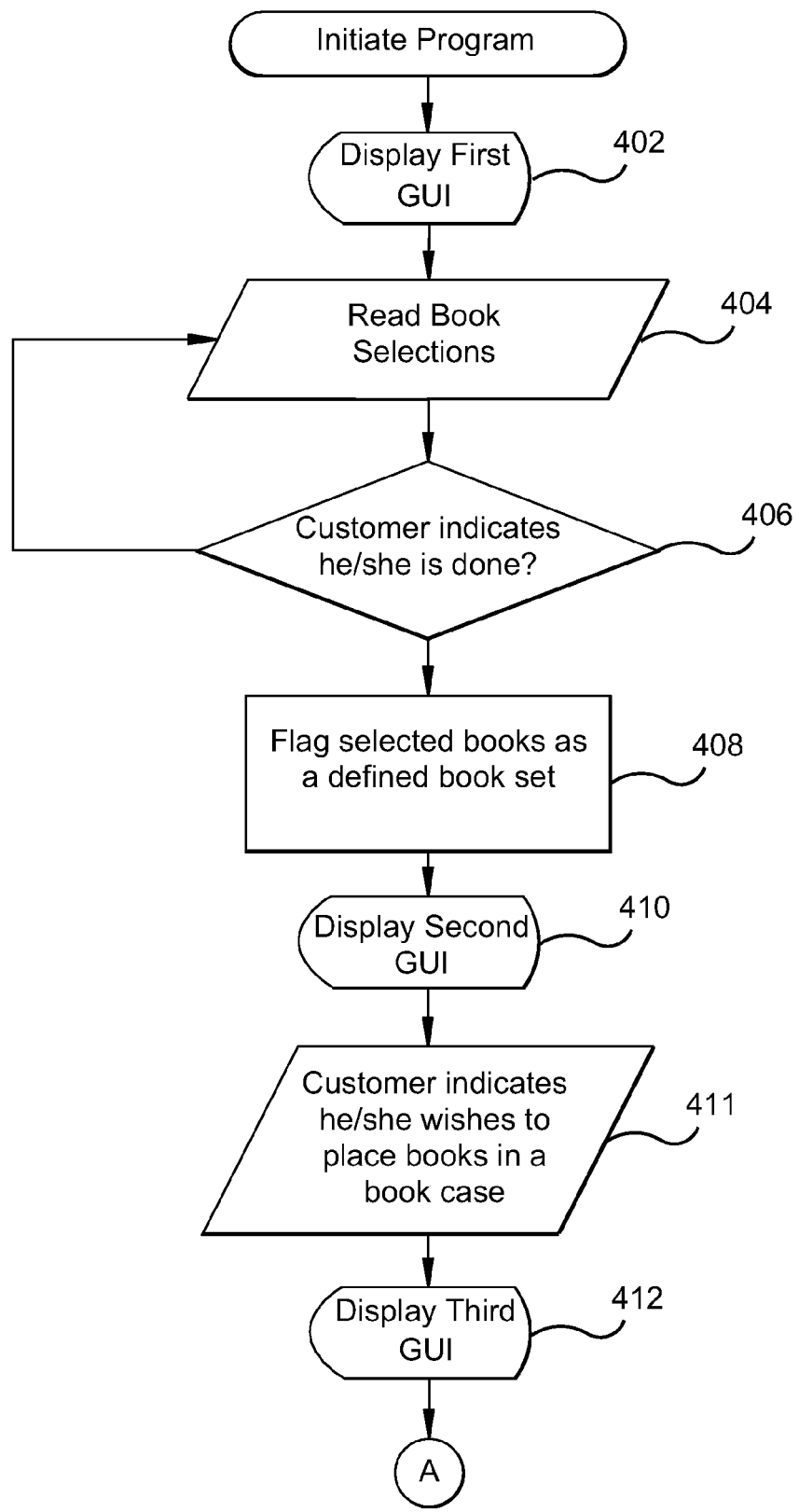
FIG. 4 is a flow diagram illustrating the operation of the computer.
Figure 4B:
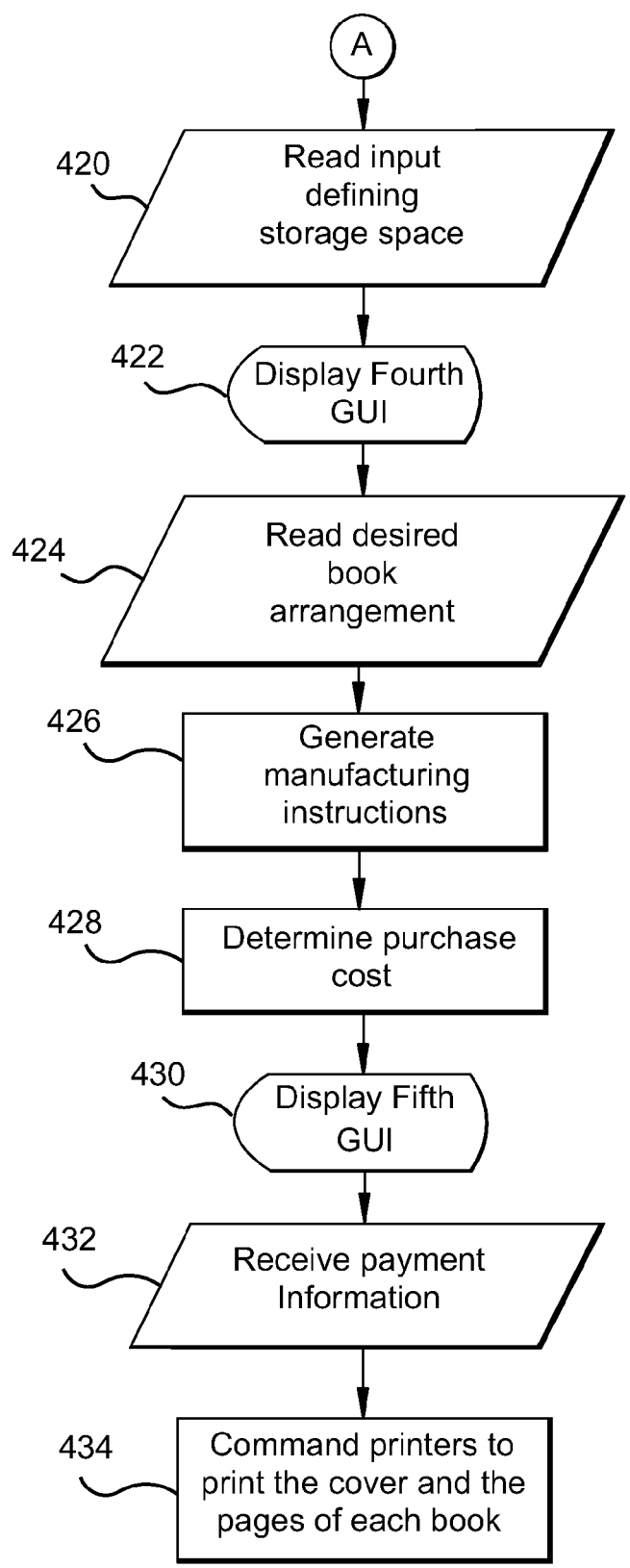

FIG. 4 is a flow diagram illustrating the operation of the computer 16 while executing the order placement program 314. As shown in FIG. 4, upon the program 314 being initiated, the computer 16 displays a first graphical user interface (GUI) (step 402). A customer can interact with this first GUI in order to browse the database 18 and to select (i.e., identify) books to purchase from the database 18. The computer 16 reads these selections at step 404.

The customer can also interact with the first GUI after one or more books have been selected to indicate he/she is finished selecting books. Upon the computer 16 receiving this indication (decision step 406) the computer 16 flags the selected book as a defined book set (step 408).

Next, the computer 16 operates to display a second GUI (step 410). By interacting with this second GUI, the customer can indicate that he/she wishes to place the book set in a particular book case.

The customer provides this input at step 411.

Next, the computer 16 displays a third GUI (step 412). The third GUI prompts the user to define the maximum "book storage space" provided by the book case. The phrase "maximum book storage space" refers to the total space provided by the book case to receive books.

Figure 5:
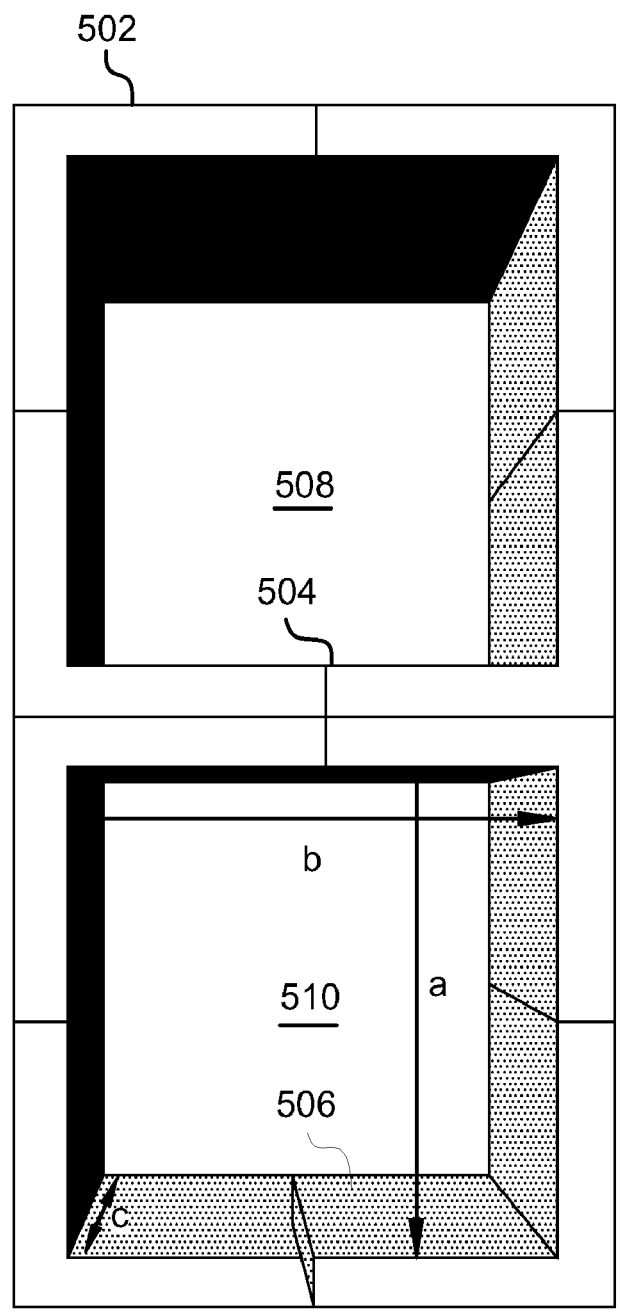
FIG. 5 illustrates a typical book case.

To illustrate further the meaning of maximum "book storage space", let us consider briefly FIG. 5. FIG. 5 shows a typical book case 502. The exemplary book case 502 includes an upper shelf surface 504 and a lower shelf surface 506. The upper shelf surface 504 and the walls surrounding the upper shelf surface 504 define an upper book storage space 508. The lower shelf surface 506 and the walls surrounding the lower shelf surface 506 define a lower book storage space 510.

In this example, the dimensions of the upper and lower storage spaces have dimensions a×b×c. The "maximum book storage space" provided by the book case 502 consists of the upper storage space 508 plus the lower storage space 510.

Referring again to FIG. 4, the third GUI displayed at step 412 prompts the customer to define the maximum book storage space provided by the book case the customer wishes to use to store the books. This is done by requesting that the customer input the following information:

(a) the number of shelves in the book case;
(b) the dimensions of the storage space defined by the upper surface of each shelf and the walls surrounding each shelf.

The customer provides this input at step 420.

Next, the computer 16 displays a fourth GUI (step 422). By interacting with this fourth GUI, the customer can indicate the order in which the books will be placed in the book case. The computer 16 receives this input at step 424.

Next, the computer 16 generates a set of manufacturing instructions for each book in the book set (step 426). As will be seen, these instructions are used later to direct the manufacture of each book in the book set. In this example, five instructions are generated for each book.

The first instruction indicates the size of the media (e.g., width, length and thickness) that is to be used to print the cover of the book. The second instruction indicates the size of the media that is to be used to print the pages of the book. The third instruction indicates the number of pages in the book. The fourth instruction indicates how the book is to be formatted (e.g., font size, line spacing, kerning parameters, placement and size of images, etc.). The fifth instruction indicates how the cover and pages of the book are to be trimmed and bound together.

The following are a typical set of instructions generated for a book at step 426.

Instruction #1: print the cover of the book onto media type A;
Instruction #2: print the pages of the book using media type B;
Instruction #3: the number of pages in the book is equal to "N"
Instruction #4: print the cover and pages of the book using a first set of pre-determined formatting criteria; and
Instruction #5: trim and bind the cover and pages using procedure A.

Wherein the media type referred to in instruction #1 and #2 defines the length, width and thickness of the media. Thus, for example, "type A" media may indicate A4 paper having a particular thickness.

In his example, the process to generate the manufacturing instructions is implemented iteratively to obtain a final set of parameters for printing that will meet all the specified criteria. Furthermore, the files in the database 18 that describe the books selected are each used to establish additional criteria for the successful iteration of these final printing parameters (i.e., number of characters for each book, certain images (possibly), and chapter and other pre-determined formatting information for each book is obtained from the electronic file that for the book).

The formatting criteria referred to in instruction #4 may define the text size and various other formatting parameters (such as kerning, margins, font styles, line spacing, page formatting, etc.) for the book. The "procedure A" referred to in instruction #5 may define how the cover and pages are to be trimmed and the binding technique that is to used to bind the printed cover and printed pages in order to produce a finished book.

Importantly, these instructions are generated for each book at step 426 in order to achieve the following objectives:
1. the books after being manufactured will have physical dimensions so that the books, as a set, can be physically placed within the storage space defined by the customer at step 420 in the order defined at step 424;
2. the books after being manufactured will meet certain minimum standards of readability and appearance (e.g., the font size of the text in the book must at least be at or above a pre-determined font size)

After the instructions for each book have been generated, the computer 16 determines a purchase cost for the book set (step 428). The computer 16 then displays a fifth GUI (step 430). This fifth GUI prompts the customer to conclude the book order and requests payment information (e.g., credit card information). The computer 16 receives this information at step 432.

If the payment information is received, the computer 16 concludes the book order by commanding the printers in the print module to print the covers and the pages of each book in the book set (step 434).

Figure 6A:
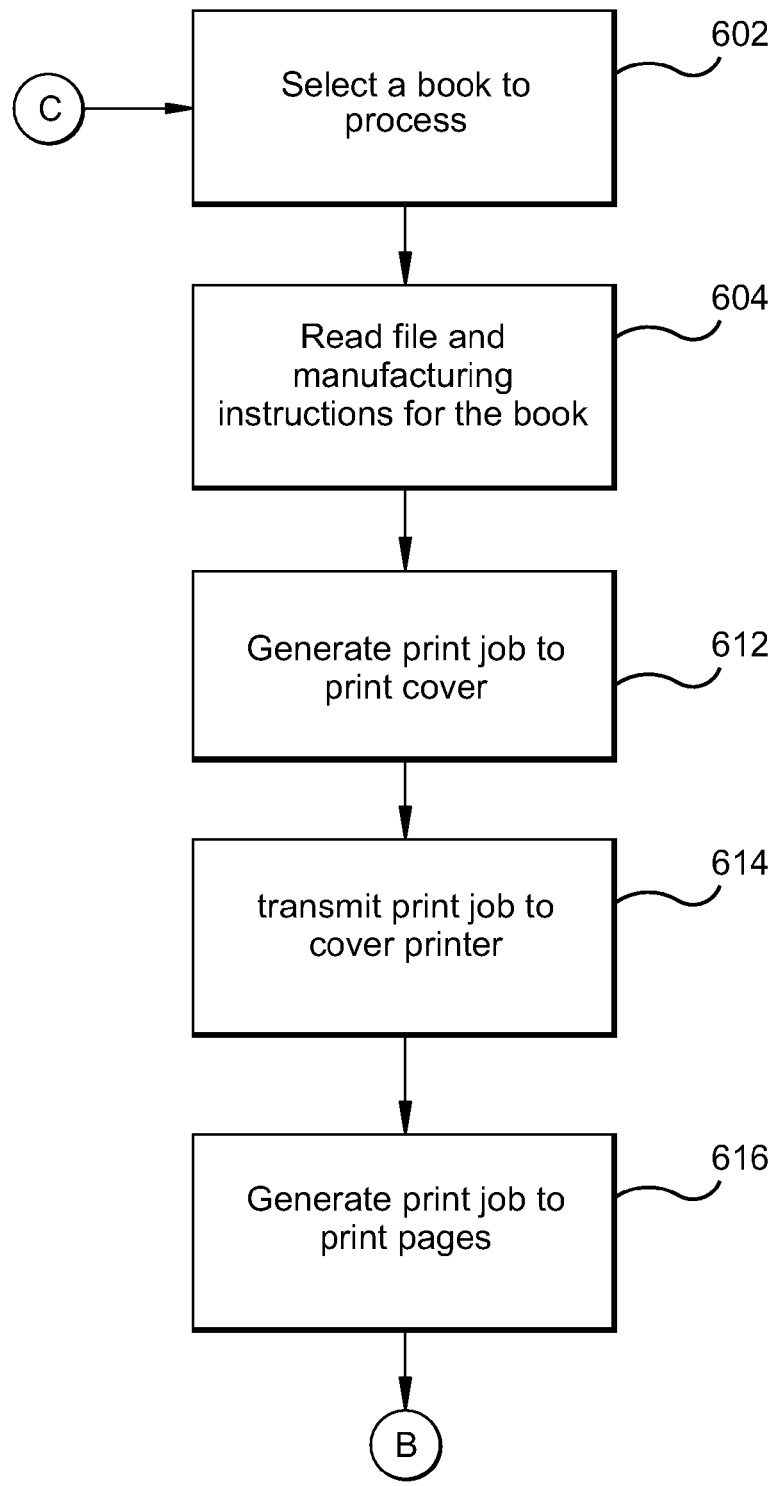
FIG. 6 is a flow diagram illustrating the operation of the computer 16 to conclude a book order.
Figure 6B:
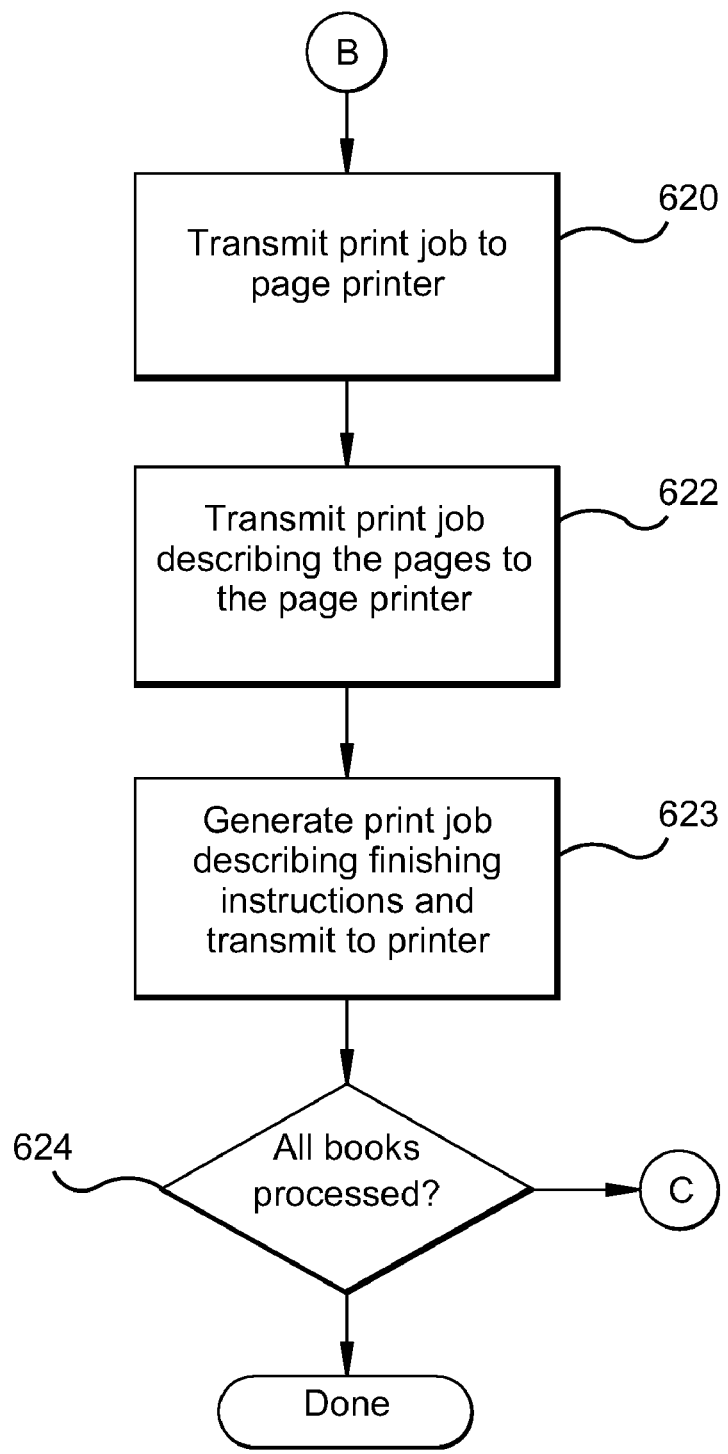

FIG. 6 is a flow diagram illustrating the operation of the computer 16 to conclude the book order. Referring now to FIG. 6, the computer 16 first selects a book from the book set to process (step 602). Next, the computer 16 reads both the file describing the book from the database 18 as well as the manufacturing instructions generated at step 426 (step 604).

The computer 16 then uses this information to generate a print job to print the cover (step 612) of the book and then transmits this print job to the cover printer 38 (step 614). Importantly, the commands in the print job are selected so as to cause the cover printer 38 to print the cover information on media of a size and in a format indicated by the recently generated and customized manufacturing instructions for the book.

Similarly, the computer 16 generates a print job to print the pages of the book (step 620) and then transmits this print job to the page printer 40 for printing (step 622). The commands in this second print job are selected so as to cause the page printer 40 to print the page information on media of a size, in a number and in a format as indicated by the manufacturing instructions for the book.

The computer 16 may also generate a third print job (step 620) that indicates the procedure that is to be used to finish the book. This print job can then transmitted to one of the printers in the print module and causes the printer to print a "finishing page". The finishing page can indicate the finishing procedure in human readable or machine readable form.

Next, the computer 16 determines if all the books from the book set has been processed, if not then steps 602–622 are repeated for another book from the set (decision step 624). This operation continues until all the books in the set have been processed.

As the print module 34 generates the cover and pages for each book in the book set, an operator retrieves the output and uses the finishing module to complete the book. This may involve trimming the book pages and the book covers as well as binding the book pages to the book covers. The trimming and binding of the book is done according to the instructions indicated by the finishing page printed for each book.

From the foregoing, it will be appreciated that the book-on demand system provided by the present invention represents a significant advance in the art. Such a system can be used to create book sets that are customized to fit within a customers existing book case or some other existing storage area. It can be seen that this invention is particularly useful in consumer applications.

The present invention may also be embodied in the form a program storage medium having computer readable program code embodied therein for causing a computer to perform one or more of the steps indicated in FIG. 4 and FIG. 6. In the context of this document, "program storage medium" can be any means that can contain, store, communicate, propagate, or transport the program for use by or in connection with an instruction execution system, apparatus or device. The program storage medium can be, for example (the following is a non-exhaustive list), a magnetic, optical, or semiconductor based storage device.

Although a specific embodiments of the invention has been described and illustrated, the invention is not to be limited to the specific forms or arrangements of parts so described and illustrated. The invention is limited only by the claims and equivalents thereof.

What is claimed is:

1. A book manufacturing method, comprising:
   identifying a set of books;
   receiving a dimension of a book storage space;
   selecting format criteria and page and cover media according to the received dimension and the identified set of books, the format criteria defining at least a font size, the selections being made so that the set of books, once manufactured, will fit within the book storage space; and
   manufacturing the set of books according to the selected format criteria and using the selected page and cover media.

2. The method of claim 1, further comprising receiving payment information.

3. The method of claim 1, further comprising receiving payment information prior to manufacturing.

4. The method of claim 3, further comprising providing a purchase cost for manufacturing the set of books.

5. A book on demand system, comprising:
   an order placement system capable of receiving input identifying a set of books and a dimension of a book storage space and of selecting page and cover media as well as format criteria according to the received dimension and the identified set of books, the format criteria defining at least a font size, the selections being made so that the set of books, once manufactured, will fit within the book storage space;
   a print module operable to use selected page media and format criteria to print the pages of the set of books and to use selected cover media to print the covers of the set of books; and
   a finishing module operable to bind each printed cover and corresponding printed pages to produce a set of finished books.

6. The book on demand system of claim 5, wherein the order placement system is capable of providing the user with a purchase cost.

7. The book on demand system of claim 6, wherein the order placement system is further capable of receiving payment information and the print module is operable to only print the cover and the pages after the order placement system receives payment information.

8. The book on demand system of claim 7, further comprising an electronic database for storing the book in an electronic form.

9. The book on demand system of claim 8, wherein the print module includes at least one printer, coupled to the order placement system, for printing the pages and cover of the books.

10. Computer readable media having instructions for:
    receiving input identifying a set of books;
    receiving input defining a dimension of a book storage space;
    selecting format criteria and page and cover media according to the received dimension and the identified set of books, the format criteria defining at least a font size, the selections being made so that the set of books, once manufactured, will fit within the book storage space; and
    directing the production of the set of books according to the selected format criteria and using selected page and cover media.

11. The media of claim 10, having further instructions for receiving payment information.

12. The media of claim 11, wherein the instructions for directing include instructions for directing only upon receipt of payment information.

13. The media of claim 12, having further instructions for providing a purchase price for the book.

* * * * *

UNITED STATES PATENT AND TRADEMARK OFFICE
CERTIFICATE OF CORRECTION

| | |
|---|---|
| PATENT NO. | : 7,236,934 B1 |
| APPLICATION NO. | : 09/653224 |
| DATED | : June 26, 2007 |
| INVENTOR(S) | : Robert C. Mayes |

It is certified that error appears in the above-identified patent and that said Letters Patent is hereby corrected as shown below:

In column 6, line 42, in Claim 9, delete "books" and insert -- book --, therefor.

Signed and Sealed this

Eighteenth Day of August, 2009

David J. Kappos
*Director of the United States Patent and Trademark Office*